(12) United States Patent
Herman

(10) Patent No.: US 11,254,316 B2
(45) Date of Patent: Feb. 22, 2022

(54) DRIVER DISTRACTION DETECTION

(71) Applicant: Ford Global Technologies, LLC, Dearborn, MI (US)

(72) Inventor: David Michael Herman, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 16/751,438

(22) Filed: Jan. 24, 2020

(65) Prior Publication Data

US 2021/0229672 A1 Jul. 29, 2021

(51) Int. Cl.
| | |
|---|---|
| *B60W 40/08* | (2012.01) |
| *G06K 9/00* | (2022.01) |
| *G06T 3/40* | (2006.01) |
| *B60R 11/04* | (2006.01) |
| *B60W 30/00* | (2006.01) |
| *B60W 10/04* | (2006.01) |
| *B60W 10/18* | (2012.01) |
| *B60W 10/20* | (2006.01) |

(Continued)

(52) U.S. Cl.
CPC ............ *B60W 40/08* (2013.01); *B60R 11/04* (2013.01); *B60W 10/04* (2013.01); *B60W 10/18* (2013.01); *B60W 10/20* (2013.01); *B60W 30/00* (2013.01); *G06K 9/00604* (2013.01); *G06K 9/00845* (2013.01); *G06T 3/4015* (2013.01); *G06T 7/70* (2017.01); *B60W 60/001* (2020.02); *B60W 2420/403* (2013.01); *G06T 2207/10028* (2013.01); *G06T 2207/30201* (2013.01); *G06T 2207/30268* (2013.01)

(58) Field of Classification Search
CPC ...... B60W 40/08; B60W 10/04; B60W 10/18; B60W 10/20; B60W 30/00; G06T 7/70; G06T 3/4015; B60R 11/04; G06K 9/00604; G06K 9/00845
See application file for complete search history.

(56) References Cited

U.S. PATENT DOCUMENTS

| | | | |
|---|---|---|---|
| 8,260,489 B2* | 9/2012 | Nielsen | B60R 1/00 701/32.2 |
| 2001/0018641 A1* | 8/2001 | Kodaka | B62D 15/0265 701/301 |

(Continued)

FOREIGN PATENT DOCUMENTS

| | | |
|---|---|---|
| EP | 3193318 B1 | 1/2019 |
| WO | 2018096053 A1 | 5/2018 |

OTHER PUBLICATIONS

Venkatrav, S., et al., "Netflix Media Database—the Media Timeline Data Model," Netfilx Technology Blog, Oct. 31, 2018, 11 pages.

(Continued)

*Primary Examiner* — Hussein Elchanti
(74) *Attorney, Agent, or Firm* — Frank A. MacKenzie; Bejin Bieneman PLC

(57) ABSTRACT

A location of a light source outside a field of view of a polarimetric image of a vehicle interior can be determined. Then, upon (a) determining, based on the polarimetric image, that the light source is other than vehicle lighting or an exterior source and (b) detecting a vehicle occupant, a vehicle actuator can be actuated based on a determined location of the light source.

20 Claims, 4 Drawing Sheets

(51) Int. Cl.
*G06T 7/70* (2017.01)
*B60W 60/00* (2020.01)

(56) References Cited

U.S. PATENT DOCUMENTS

| | | | |
|---|---|---|---|
| 2008/0060497 A1* | 3/2008 | Lambert | G01B 7/003 |
| | | | 84/307 |
| 2008/0201039 A1* | 8/2008 | Matsuoka | B60W 50/16 |
| | | | 701/41 |
| 2009/0051516 A1* | 2/2009 | Abel | B60W 50/14 |
| | | | 340/436 |
| 2009/0115846 A1* | 5/2009 | Ohue | B60R 11/04 |
| | | | 348/148 |
| 2010/0049375 A1* | 2/2010 | Tanimoto | B62D 15/025 |
| | | | 701/1 |
| 2010/0220892 A1* | 9/2010 | Kawakubo | G06K 9/00845 |
| | | | 382/103 |
| 2011/0010094 A1* | 1/2011 | Simon | G08G 1/167 |
| | | | 701/301 |
| 2011/0025489 A1* | 2/2011 | Shimoda | B62D 15/0295 |
| | | | 340/459 |
| 2012/0214463 A1* | 8/2012 | Smith | H04W 4/027 |
| | | | 455/418 |
| 2013/0063340 A1* | 3/2013 | Mondragon | G06F 1/1605 |
| | | | 345/156 |
| 2013/0179198 A1* | 7/2013 | Bowne | G06Q 30/0283 |
| | | | 705/4 |
| 2013/0184979 A1* | 7/2013 | Karandikar | B60W 30/18027 |
| | | | 701/301 |
| 2013/0317865 A1* | 11/2013 | Tofte | G06Q 40/08 |
| | | | 705/4 |
| 2013/0342334 A1* | 12/2013 | Mcqueen | G08B 6/00 |
| | | | 340/436 |
| 2014/0002651 A1* | 1/2014 | Plante | G08G 1/20 |
| | | | 348/148 |
| 2014/0012492 A1* | 1/2014 | Bowers | G08G 1/16 |
| | | | 701/301 |
| 2014/0047371 A1* | 2/2014 | Palmer | H04N 21/8545 |
| | | | 715/771 |
| 2015/0254781 A1* | 9/2015 | Binion | G07C 5/12 |
| | | | 701/32.2 |
| 2016/0316237 A1* | 10/2016 | Couleaud | H04N 21/25883 |
| 2017/0106876 A1* | 4/2017 | Gordon | B60W 30/182 |
| 2017/0279957 A1* | 9/2017 | Abramson et al. | G06F 21/36 |
| 2019/0170586 A1 | 6/2019 | Mitani et al. | |
| 2019/0263317 A1* | 8/2019 | Chen | F21S 41/143 |
| 2021/0261050 A1* | 8/2021 | Sobhany | B60W 50/14 |
| 2021/0300160 A1* | 9/2021 | Ha Dar | B60J 3/06 |
| 2021/0300367 A1* | 9/2021 | Yamashita | G06K 9/00825 |

OTHER PUBLICATIONS

Gornale, S., et al., "Analysis and Detection of Content Based Video Retrieval," International Journal of Image, Graphics, and Signal Processing, Mar. 2019, 16 pages.
"Ray Tracing (physics)," Wikipedia, Dec. 16, 2019, 5 pages.
"Light Field Camera," Wikipedia, Dec. 16, 2019, 6 pages.
"Stokes Parameters," Wikipedia, Dec. 16, 2019, 9 pages.
"SDK speeds development for polarized imaging applications," Vision Systems Design, Oct. 4, 2019, 14 pages.

* cited by examiner

DRIVER DISTRACTION DETECTION

BACKGROUND

A challenge may arise when a vehicle operator uses a user device such as a smartphone. A vehicle computer may be used to detect a user device in the vehicle, e.g., with data from a vehicle interior camera sensor. However, it is a problem to identify a user device when the user device is located outside a field of view of a vehicle interior camera sensor.

DETAILED DESCRIPTION

Introduction

Figure 1:
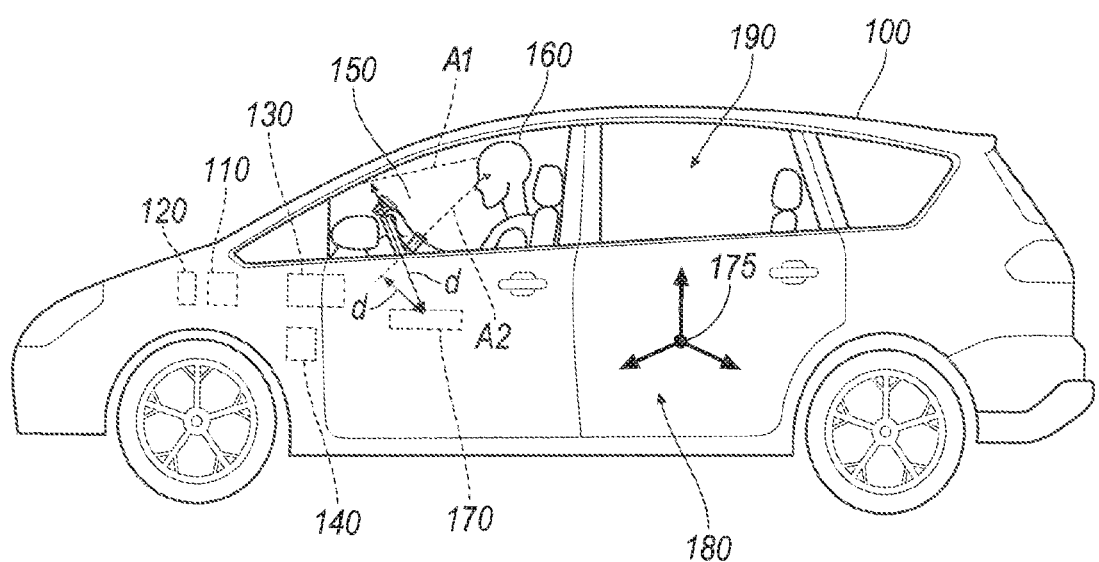
FIG. 1 is a diagram illustrating an example vehicle, an occupant, and a user device in the vehicle.

Disclosed herein is a system comprising a processor and a memory. The memory stores instructions executable by the processor to determine location of a light source outside a field of view of a polarimetric image of a vehicle interior, and upon (a) determining, based on the polarimetric image, that the light source is other than vehicle lighting or an exterior source and (b) detecting a vehicle occupant, then to actuate a vehicle actuator based on a determined location of the light source.

The instructions may further include instructions to actuate the vehicle actuator based on, in addition to the determined location of the first light source, (i) a frequency of the vehicle occupant looking at the light source exceeding a frequency threshold, (ii) whether the light source is a user device, (iii) a duration of the vehicle occupant looking at the light source exceeding a time threshold, and (iv) the vehicle occupant controlling at least one of vehicle propulsion, steering, and braking.

The instructions may further include instructions to actuate the vehicle actuator based on determining a type of media output of the user device based on a plurality of received polarimetric images, wherein the type of media is one of a video playback, an interactive messaging, and a displayed navigation instruction.

The instructions may further include instructions to determine that the vehicle occupant is looking at the light source based on a detected vehicle occupant head direction, a detected vehicle occupant eye gaze, and an estimated location of the light source.

The system may further include a camera sensor having a polarizing imaging device, wherein the polarizing imaging device generates the polarimetric image data for each image pixel based on image attributes including a polarization axe, a luminosity, and a color space.

The instructions may further include instructions to generate a de-mosaicked image based on the received image, and to generate a polarization map based on the de-mosaicked image.

The exterior source may be one of a sky dome, a sun, a moon, a street light, a light of a second vehicle, an illuminated display device, and a display mounted to a second vehicle.

The instructions may further include instructions to classify the light source based on a polarization map and a depth map, wherein the depth map is generated based on the received polarimetric image, and to determine a three-dimensional location of the light source based on the depth map and a detected shadow pattern of the light source on an object including a vehicle occupant within the received image.

The instructions may further include instructions to determine whether the light source is a user device based on a polarization map of the received image and a polarization characteristic of the user device.

The instructions may further include instructions to determine that a polarized light included in the received image is from a user device other than the vehicle lighting based on an actuation instruction sent to the vehicle display including a timing of actuating the vehicle lighting.

The instructions may further include instructions to determine a location of the environmental source based on a sky dome model and data received from a second computer including location coordinates of a second vehicle.

Further disclosed herein is a method, comprising determining location of a light source outside a field of view of a polarimetric image of a vehicle interior, and upon (a) determining, based on the polarimetric image, that the light source is other than vehicle lighting or an exterior source and (b) detecting a vehicle occupant, then actuating a vehicle actuator based on a determined location of the light source.

The method may further include actuating the vehicle actuator based on, in addition to the determined location of the first light source, (i) a frequency of the vehicle occupant looking at the light source exceeding a frequency threshold, (ii) whether the light source is a user device, (iii) a duration of the vehicle occupant looking at the light source exceeding a time threshold, and (iv) the vehicle occupant controlling at least one of vehicle propulsion, steering, and braking.

The method may further include actuating the vehicle actuator based on determining a type of media output of the user device based on a plurality of received polarimetric images, wherein the type of media is one of a video playback, an interactive messaging, and a displayed navigation instruction.

The method may further include determining that the vehicle occupant is looking at the light source based on a detected vehicle occupant head direction, a detected vehicle occupant eye gaze, and an estimated location of the light source.

The exterior source is one of a sky dome, a sun, a moon, a street light, a light of a second vehicle, an illuminated display device, and a display mounted to a second vehicle.

The method may further include classifying the light source based on a polarization map and a depth map, wherein the depth map is generated based on the received polarimetric image; and determining a three-dimensional location of the light source based on the depth map and a detected shadow pattern of the light source on an object including a vehicle occupant within the received image.

The method may further include determining whether the light source is a user device based on a polarization map of the received image and a polarization characteristic of the user device.

The method may further include determining that a polarized light included in the received image is from a user device other than the vehicle lighting based on an actuation instruction sent to the vehicle display including a timing of actuating the vehicle lighting.

The method may further include determining a location of the environmental source based on a sky dome model and data received from a second computer including location coordinates of a second vehicle.

Further disclosed herein is a system, comprising means for determining location of a light source outside a field of view of a polarimetric image of a vehicle interior, and means for actuating a vehicle actuator based on a determined location of the light source, upon (a) determining, based on the polarimetric image, that the light source is other than vehicle lighting or an exterior source and (b) detecting a vehicle occupant.

Further disclosed is a computing device programmed to execute any of the above method steps. Yet further disclosed is a vehicle comprising the computing device.

Yet further disclosed is a computer program product comprising a computer-readable medium storing instructions executable by a computer processor, to execute any of the above method steps.

Exemplary System Elements

Technical limitations of sensors such as image sensors including being limited to a defined direct field of view are addressed herein. In an example implementation, a vehicle computer can detect a user device outside a field of view of a vehicle interior camera sensor based on polarimetric image data received from the interior camera sensor. The computer can further detect whether a vehicle operator (i.e., a vehicle user that operates the vehicle) is distracted by the user device detected outside the field of view of the camera sensor. Therefore, the present disclosure advantageously overcomes present shortcomings in sensed image data and the interpretation of such image data, to detect a user device outside a field of view of the interior camera sensor and furthermore, can determine whether a vehicle operator is interacting with the detected user device, as opposed to directing attention to an object or scene outside the vehicle, e.g., looking out a window to effect a lane change. Moreover, the present disclosure advantageously overcomes present shortcoming in only detecting a driver head pose and/or eye gaze, by detecting a location of a user device, e.g., on a vehicle dashboard, that may block a view of the driver, although a head pose and/or eye gaze of the driver may indicate that the driver is looking at a scene outside the vehicle.

These technical advantages are provided by a vehicle computer programmed to determine location of a light source, e.g., a smartphone, outside a field of view of a polarimetric image of a vehicle interior, and upon (a) determining, based on the polarimetric image, that the light source is other than vehicle lighting or an exterior source and (b) detecting a vehicle occupant, then actuating a vehicle actuator based on a determined location of the light source. For example, the vehicle computer could determine that a user is looking at a user device such as a smartphone or the like on the operator's lap, on the dashboard of vehicle, or placed on vehicle center console, and could then actuate a vehicle actuator, e.g., to deactivate a semi-autonomous or non-autonomous operation mode, to generate sound, etc.

FIG. 1 illustrates a vehicle 100, an occupant 160, and a user device 170. The vehicle 100 may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, and a human-machine interface (HMI 140). The vehicle 100 can have a reference point 175, e.g., a geometric center (i.e., a point where a longitudinal axis and a lateral axis of a vehicle 100 body intersect), or some other specified point. The vehicle 100 may include an interior compartment or interior 190, e.g., a passenger cabin. The vehicle 100 interior 190 is a space inside the vehicle 100. One or more occupants 160 may be in the vehicle 100. The user device(s) 170 can include smartphone(s), tablet(s), media players, etc.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous mode, a semi-autonomous mode, or a non-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode, an operator occupant 160, i.e., one of the one or more occupant(s) 160, controls the vehicle 100 propulsion, braking, and steering.

Thus, in a non-autonomous mode or a semi-autonomous mode, an operator occupant 160 receives information from vehicle 100 exterior, e.g., visual and audio information from the roadway, and controls one or more vehicle 100 operations based on the received information. In other words, an operator occupant 160 observes a road, objects such as other vehicles and pedestrians on the road, etc., in order to control one or more vehicle 100 operations (i.e., propulsion, steering, and/or braking). An operator occupant 160 may be identified based on a stored seating location of an operator occupant 160, e.g., front left seat, and/or based on sensor 130 data, e.g., detecting the operator occupant 160 based on facial recognition and stored facial information of the operator occupant 160 in a computer 110 memory. Additionally or alternatively, the computer 110 may be programmed to identify, e.g., based on camera sensor 130 data, an operator occupant 160 upon determining that an occupant 160 controls at least one of a vehicle 100 propulsion, braking, and steering, e.g., holding a vehicle steering wheel.

In some examples, in an autonomous mode, a vehicle 100 occupant 160 may receive information from a vehicle 100 HMI 140 instructing the occupant 160 to regain a control of the vehicle 100 propulsion, braking, and/or steering upon detecting specified conditions, e.g., upon detecting a failure in one or more vehicle 100 sensors 130.

The computer 110 may include programming to operate one or more of vehicle 100 brakes, propulsion (e.g., control of vehicle 100 speed and/or acceleration by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations. For example, the computer 110 may determine that in the non-autonomous mode, a human operator is to control the propulsion, steering, and braking operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 100 communication network may be used for communications between devices represented as the computer 110 in this disclosure. As discussed further below, various electronic controllers and/or sensors 130 may provide data to the computer 110 via the vehicle communication network.

The vehicle 100 actuators 120 are implemented via circuits, chips, or other electronic and/or mechanical components that can actuate various vehicle subsystems in accordance with appropriate control signals, as is known. The actuators 120 may be used to control vehicle 100 systems such as braking, acceleration, and/or steering of the vehicles 100.

Vehicle 100 sensors 130 may include a variety of devices known to provide data via the vehicle communications bus. For example, the sensors 130 may include one or more camera, radar, infrared, and/or LIDAR sensors 130 disposed in the vehicle 100 and/or on the vehicle 100 providing data encompassing at least some of the vehicle 100 interior and exterior. The data may be received by the computer 110 through a suitable interface. A LIDAR sensor 130 disposed, e.g., on a top of the vehicle 100, may provide object data including relative locations, sizes, and shapes of objects such as other vehicles surrounding the vehicle 100. A vehicle 100 computer 110 may receive the object data and operate the vehicle in an autonomous and/or semi-autonomous mode based at least in part on the received object data. A vehicle 100 interior camera sensor 130 with a field of view 150 may provide image data from the interior 190, e.g., including occupant(s) 160.

The HMI 140 may be configured to receive occupant 160 input, e.g., during operation of the vehicle 100 and/or output data (present visually and/or textually) to a vehicle 100 occupant 160. An occupant 160 may select a mode of operation, e.g., an autonomous mode, by inputting a requested mode of operation via an HMI 140. Moreover, an HMI 140 may be configured to present information to the occupant 160. Thus, an HMI 140 may be located in the interior 190 of the vehicle 100. In an example, the computer 110 may output information indicating that in a selected vehicle 100 mode of operation, e.g., non-autonomous and/or semi-autonomous mode, an operator occupant 160 may not interact with a user device 170.

An HMI 140 typically includes an LCD (Liquid Crystal Display) to output images, text, etc. An LCD operates based upon interaction of rod-like liquid crystalline molecules with an electric field and polarized light waves. Thus, when operating, LCDs generate polarized light. The LCDs operate based on a Pulse Width Modulation (PWM) control signal which causes an LCD light output to flicker. A frequency of PWM signal, e.g., at a frequency of 362 Hertz (Hz), controlling an LCD is greater than a frequency that is detectable for an occupant 160 eye. In other words, human operator 160 eye may see a permanent light from an LCD, although the LCD light is periodically being turned ON and OFF. Similarly, a user device 170 such as a smartphone, tablet, etc., typically includes an LCD, i.e., user devices 170 typically also generate polarized light. For example, at a PWM frequency of 362 Hz and a duty cycle of 50%, the LCD light is ON for approximately 1.4 milliseconds (ms) and OFF for 1.4 ms. In addition, a computer such as the vehicle computer 110 may actuate an HMI 140 LCD to modify a backlight illumination level and/or a polarization degree to control light output intensity of individual LCD pixels. The computer 110 may be programmed to receive image data from the interior camera sensor 130 during specific times (e.g., OFF times, as discussed above) optimized to remove or reduce interreference of the HMI 140 polarized light output. For example, the computer 110 may receive multiple images in times when the HMI 140 output has, e.g. no light output (OFF times), full intensity light output (ON times), and/or half intensity light output. In another example, the computer 110 may be programmed to actuate the vehicle HMI 140 to vary spatially to utilize photometric stereo approach to detect a user device 170 emitting light within a field of view 150.

Polarization of light (or a light beam) may be specified with a degree of polarization and a direction of polarization. Additionally or alternatively, a polarization of light may be specified by Stokes parameters which include an intensity, a degree of polarization, and shape parameters of a polarization ellipse. A light wave that is vibrating in more than one direction is referred to as unpolarized light. Polarized light waves are light waves in which the vibrations occur wholly or partially in a single plane. The process of transforming unpolarized light into polarized light is known as polarization. The direction of polarization is defined to be a direction parallel to an electromagnetic field of the light wave. A direction of polarization (i.e., a direction of vibration) may be specified with an angle between 0 and 360 degrees. Unpolarized light includes many light waves (or rays) having random polarization directions, e.g., sunlight, moonlight, fluorescent light, vehicle headlights, etc.

Light can be polarized by passage through a polarizing filter or other polarizing material. A degree of polarization is a quantity used to describe the portion of an electromagnetic wave that is polarized. A perfectly polarized wave has a degree of polarization (or polarization degree) of 100% (i.e., restricting light waves to one direction), whereas an unpolarized wave has a polarization degree of 0% (i.e., no restriction with respect to a direction of vibration of a light wave). A partially polarized wave can be represented by a combination of polarized and unpolarized components, thus having a polarization degree between 0 and 100%. A polarization degree is calculated as a fraction of a total power that is carried by the polarized component of the light wave.

A vehicle 100 computer 110 can be programmed to determine a location of a light source, e.g., the user device 170 (FIG. 1), outside a field of view 150 of a polarimetric image of a vehicle 100 interior 190, and, upon (a) determining, based on the polarimetric image, that the light source is other than vehicle 100 lighting, e.g., HMI 140, or an exterior light source and (b) detecting a vehicle 100 occupant 160, then actuate a vehicle 100 actuator 120 based on a determined location of the light source. An exterior light source is a light source located outside the vehicle 100 interior 190, e.g., the sun, the moon, a street light, a light of a second vehicle, an illuminated display device, and/or a display mounted to a second vehicle, e.g., an advertisement display on a bus, train, etc.

A polarimetric image, in the present context, is an image received from a polarimetric camera sensor 130. A polarimetric camera sensor 130 is a digital camera including optical and/or electronic components, e.g., an imaging device 200 (FIG. 2), configured to filter polarized light and detect the polarization of the received light. A polarimetric camera sensor 130 may determine a polarization degree of received light in various polarization directions. Light has physical properties such as brightness (or amplitude), color (or wavelength), polarization direction, and a polarization degree. For example, unpolarized light may have a population of light waves uniformly distributed in various directions (i.e., having different directions) resulting in a "low" polarization degree (i.e., below a specified threshold) and fully polarized light may include light waves having one direction resulting in a "high" polarization degree (i.e., above a specified threshold). In the present context, a "low" polarization degree may be 0% to 10%, and a_"high" polarization degree may be defined as 90% to 100%. Each of these physical properties may be determined by a polarimetric camera sensor 130.

Figure 2:
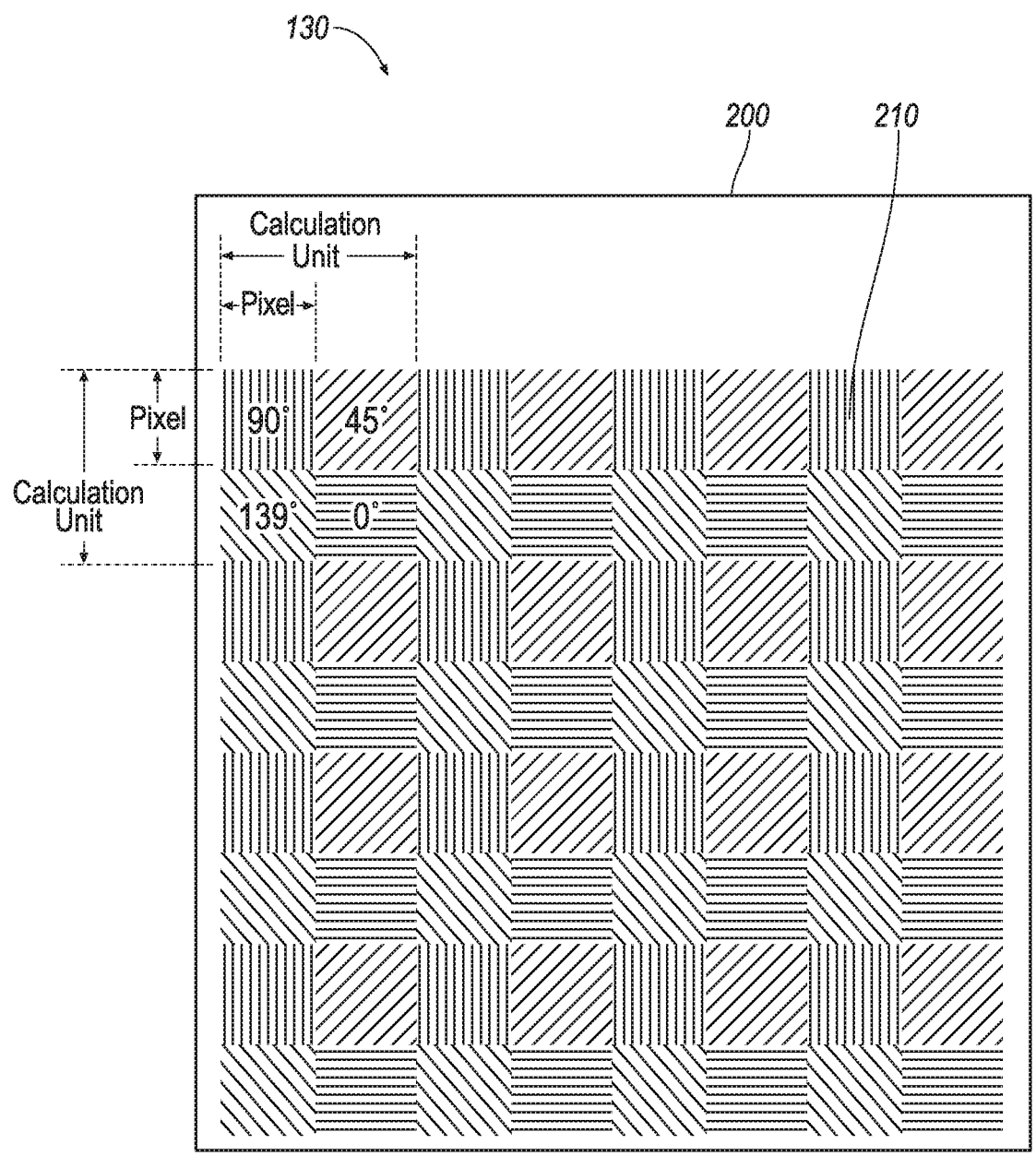
FIG. 2 is a diagram showing an example imaging sensor for detection of received light polarization.

With reference to FIG. 2, a polarimetric camera sensor 130 typically includes a polarizing imaging device 200. Polarizing imaging device 200 is an optoelectronic component that converts light to electrical signals. Image data output from an imaging device 200 typically includes a plurality of pixel, e.g. 1 megapixel. The imaging device 200 may include a plurality of individual optoelectronic components 210, each generating an electrical signal for each image pixel. Image data generated by the imaging device 200 for each image pixel may be based on image attributes including a polarization direction (or axis), polarization degree, a luminosity, and/or a color space.

To filter detected polarized light, a polarizing material, e.g., in form of a film, may be placed on the imaging device 200 and/or may be included in the imaging device 200. For example, to produce a polarizing film, tiny crystallites of iodoquinine sulfate, oriented in the same direction, may be embedded in a transparent polymeric film to prevent migration and reorientation of the crystals. As shown in FIG. 2, the polarizing material on each optoelectronic component 210 may be configured such that light with a specific polarization direction, e.g., 0 (zero), 45, 90, 270 degrees, passes through the polarizing film. In one example, each optoelectronic component 210 generates image data corresponding to one or more image pixels. In one example, the optoelectronic components 200 of the imaging device 200 may be arranged such that each set of 2×2 optoelectronic components 210 includes one of 0 (zero), 45, 90, and 270 degrees polarizing films. A polarimetric image is then produced using known de-mosaicking techniques, as discussed below. Additionally or alternatively, other techniques may be used such as a spinning filter, electro-optical filter, etc.

Luminosity (or light intensity) is a measure of the wavelength-weighted power emitted by a light source in a particular direction per unit solid angle, based on the luminosity function, a standardized model of the sensitivity of the human eye. The SI unit of luminous intensity is the candela (cd).

As discussed above, each of the optoelectronic components 210 of the imaging device 200 may detect light with a specific polarization direction. The computer 110 may be programmed to generate an image based on outputs of the optoelectronic components 210. This process is typically referred to as "de-mosaicking." In the "de-mosaicking" process, the computer 110 may combine the image data received from each of the 2×2 adjacent optoelectronic sensors 210 and calculate the polarization degree, luminosity, and polarization direction of the received light for the set of 4 (four) optoelectronic components 210, e.g., assuming a degree of polarization of 45 degrees for the portion of image that is received from the optoelectronic component 210 having a 90 degree polarization film. In other words, considering the small size of pixels, assuming the light received at 90 degree pixel has same 45 degree polarization component received at the adjacent pixel, i.e., within a same set four optoelectronic components 210. The produced image after de-mosaicking may be referred to as the de-mosaicked image.

The computer 110 may be programmed to determine a luminosity, polarization direction, and degree of polarization, e.g., for each image pixel, based on data received from the camera sensor 130. The computer 110 may be programmed to generate a polarization map based on the received image data. A polarization map is a set of data specifying a polarization degree, polarization direction, and/or luminosity of each portion of the image received from the camera sensor 130. The computer 110 may determine a set of luminosity (e.g., specified in candela), a polarization direction (e.g., 0 to 360 degrees), and a polarization degree (e.g., 0 to 100%) for each pixel of the image.

For example, the computer 110 may be programmed to generate a polarization map including a set of polarization data for each pixel of the image such as is shown in Table 1. Thus, the polarization map may specify whether polarized light with each of the four polarization directions detected and specify a polarization degree for each of the polarization directions.

TABLE 1

| Data | Description |
| --- | --- |
| Luminosity | Luminosity specified in candela (cd). |
| 0 (zero) degree polarization degree | A degree of polarization of light at the polarization direction of 0 (zero) degrees, e.g., a number between 0 (zero) and 100%. |
| 45 degree polarization | A degree of polarization of light at the polarization direction of 45 degrees, e.g., a number between 0 (zero) and 100%. |
| 90 degree polarization | A degree of polarization of light at the polarization direction of 90 degrees, e.g., a number between 0 (zero) and 100%. |
| 270 degree polarization | A degree of polarization of light at the polarization direction of 270 degrees, e.g., a number between 0 (zero) and 100%. |

The computer 110 may be programmed to generate the polarization map based on image data received from the imaging device 200 of the camera sensor 130. Additionally or alternatively, the camera sensor 130 may include electronic components which generate the polarization map and output the polarization map data to the computer 110. Thus, the computer 110 may receive polarization data, e.g., as illustrated by Table 1, for each pixel or set of pixels, from the polarimetric camera sensor 130.

The vehicle 100 HMI 140 typically includes an LCD display which, as discussed above, typically outputs polarized light during operation of the vehicle 100. Thus, the vehicle 100 operator occupant 160 may view the information displayed on the HMI 140 and use the received information in operating the vehicle 100. That is why the computer 110 may be programmed to determine whether a light source other than the vehicle 100 lighting (HMI 140) is in the vehicle 100, thereby ignoring polarized light generated by the vehicle 100 HMI 140.

As discussed above, the LCDs are actuated using a PWM and are not permanently on or activated. In one example, the computer 110 may be programmed to determine whether polarized light detected in the received image is from a user device 170 other than the vehicle lighting, e.g., the HMI 140, based on an actuation instruction sent to the vehicle 100

HMI 140. For example, the computer 110 may be programmed to identify a period of time when a vehicle 100 HMI 140 is inactive or OFF, based on the PWM control signal sent to the HMI 140, and to generate the polarization map based on image data received during the time when the HMI 140 is off, thus ensuring that polarized light detected in the received image is from a light source other than the vehicle 100 lighting, e.g., HMI 140. Thus, the computer 110 may be programmed to receive image data from the polarimetric camera sensor 130 during the period of OFF time of HMI 140 display based on received data including actuation times (i.e., ON and OFF times) of the HMI 140 display.

Additionally or alternatively, the computer 110 may store the 3D location coordinates of the HMI 140. Thus, the computer 110 may determine that the light source is the HMI 140 upon determining that the estimated 3D location of the light source is within a distance threshold of the HMI 140 location, e.g., a distance between a reference point of the HM 140 and the estimated location of the light source is less than a threshold such as 10 cm. A 3D location is a location specified according to coordinates in three dimensions, e.g., X, Y, and Z coordinates of a vehicle 100 coordinate system 180.

As discussed above, user devices 170 such as a tablet, smartphone, etc., produce polarized light. The computer 110 may be programmed to store a polarization characteristic of user devices 170 such as tablet, smartphone, etc., in a computer 110 memory. In the present context, a polarization characteristic is a set of data specifying a range of polarization degree, e.g., 100%, polarization direction, e.g., 45 degrees, luminosity, etc., of light generated by a display of a user device 170. For example, a polarization characteristic may specify a range of polarization degree and/or a set of polarization directions of a user device 170, e.g., 30% to 50% polarization degree for a polarization direction of 45 degrees and 0% polarization degree for other polarization directions. The computer 110 may be programmed to determine that a polarized-light-generating user device 170 based on the polarization map and the stored polarization characteristic. For example, the computer 110 may determine based on the polarization map (e.g., Table 1) that the polarization degree of light polarized at 45 degrees in the received light is 40% which is in the range 30 to 50% specified in the polarization characteristics and thus concluding that the detected light in the image is from a user device 170. Note that in presence of an exterior light source such as sunlight, moonlight, a street lamp, etc., the light generated by the user device 170 may be comparably negligible, however because the camera sensor 130 filters out the light to detect polarized light, the light generated by a user device 170 may be still detected. For example, the computer 110 may detect, based on the polarization map, polarized light on the face or clothing of an operator occupant 160. The computer 110 may detect the occupant 160 face using conventional computer vision techniques and then determine, based on the polarization map and the stored polarization characteristics, that the face of the operator occupant 160 is illuminated by the polarized light generated by a user device 170.

In the present context, a depth map is a set of data specifying a 3D (three-dimensional) locations of points in an image. For example, a depth map may include a set of 3D coordinates for each pixel of the received camera image, e.g., with respect to the coordinate system 180 with an origin at the vehicle 100 reference point 175. In other words, a depth map provides 3D location coordinates of real-world surface points represented in respective pixels of the image.

For example, the depth map may include 3D location coordinates of the points, visible in the image, e.g., on occupants 160, seats, etc., in the interior 190 of the vehicle 100. Thus, a depth map may include 3D coordinates corresponding to each pixel of the image. The computer 110 may be programmed, using conventional computer vision techniques, to generate a depth map for the received within the field of view 150 of the camera sensor 130. The computer 110 may be programmed to generate a depth map by processing image data received from two or more camera sensors 130 viewing the interior 190 of the vehicle 100 from different locations while having an overlapping field of view 150. Alternatively, other methods of generating a depth map may include use of a camera capable of detecting light fields, use of photometric stereo methods, or monocular depth estimation techniques which typically utilize a neural network based transformation of 2D image data.

The computer 110 may be programmed to determine a 3D location of the light source, e.g., the user device 170, based on the depth map and a detected shadow pattern of the light source on an object within the received image, e.g., an occupant 160. The 3D location coordinates in the depth map may be provided with respect to a Cartesian coordinate system 180 with an origin located at the vehicle 100 reference point 175. The computer 110 may detect a shadow of an object based on detecting a shape of a shadow area in the image and a detected shape of the object in the image. For example, the computer 110 may identify a substantially triangular-shaped shadow on an occupant 160 face as a shadow of the occupant 160 nose.

As an example, the computer 110 may be programmed to estimate a 3D location of the user device 170 outside the field of view 150 based on detected shadow of the polarized light of the user device 170 on an occupant 160 face, e.g., dependent on a 3D location of the user device 170 a shadow of occupant 160 nose on occupant 160 face may vary. Thus, the computer 110 may estimate the 3D location of the user device 170 based on the detected shadow of polarized light on occupant 160 face. For example, the computer 110 may detect a shadow of a tip of the occupant 160 nose on a left eye of the occupant 160. The computer 110 then determines the 3D location of the tip of the nose and the 3D location of the eye of the occupant 160 based on the depth map, and then estimates a 3D location of the user device 170 based on the determined location of the tip of the occupant 160 nose and the shadow thereof, e.g., by determining a line passing through the shadow and the object causing the shadow. In this example, the computer 110 may estimate a location of the user device 170 outside the field of view 150 to be along the determined line, as discussed above, although the computer 110 may or may not be able to determine an exact location of the user device 170 along the determined line.

The computer 110 may be programmed to identify exterior light sources and their 3D location based on (i) vehicle 100 sensor(s) 130 data, e.g., a front camera sensor 130 detecting a second vehicle, a street light, a road-side display, etc., (ii) map data, e.g., including location(s) of roadside displays, street lights, etc., (iii) weather data specifying cloudiness of the sky thus specifying an amount of sunlight or moonlight that reaches the vehicle 100 (e.g., using ray tracing simulations techniques with inclusion of polarization degree and direction of detected light, a phenological model to learn the physics of interacting light with material inside the vehicle 100, and then using such model to output to remove ambient light from the detected light), and/or (iv) sky dome model data (or any other technique to model atmospheric phenomena) specifying sun location, moon location, etc., based on date and time of day. Additionally or alternatively, the computer 110 may be programmed to determine a location of an exterior light source, e.g., a second vehicle headlight, based on data received from a second computer, e.g., a second vehicle computer. For example, the computer 110 may be programmed to receive a GPS (Global Positioning System) location of a moving light, e.g., a light of a second vehicle, and to determine the location of the second vehicle light with respect to the coordinate system 180 further based on GPS location of the vehicle 100, e.g., received from a vehicle 100 GPS sensor 130.

The computer 110 may be programmed to classify the light source(s) based on a polarization map and a depth map. The computer 110 may be programmed to estimate the 3D location of detected light source(s), e.g., the user device 170, and then classify the detected light sources to be (i) a vehicle device, e.g., HMI 140, (ii) a user device 170, (iii) exterior natural light source, i.e., the sun and the moon, (iv) an infrastructure light such as street light, illuminated display device, e.g., an advertising board, etc., and (v) exterior vehicle light of, e.g., a second vehicle, motorcycle, etc. The computer 110 may be programmed to store results of light source classification in a computer 110 memory, e.g., Table 2. Example Table 2 shows a list of N detected light sources, 3D location coordinates of each detected light source with respect to the coordinate system 180, and the determined class of the light source.

TABLE 2

| Light source identifier | Data |
| --- | --- |
| Light source 1 | 3D location, light source class |
| ... | ... |
| Light source N | 3D location, light source class |

The computer 110 may be programmed to classify the light sources based on the polarization map, depth map, data received from other vehicles, e.g., GPS location, map data including infrastructure light sources, e.g., street lights location, vehicle 100 GPS sensor 130, etc. For example, the computer 110 may classify an exterior light as infrastructure light class based on map data including the location of the light source outside the vehicle 100. The computer 110 may be programmed to classify an exterior light source as a light of a second vehicle based on GPS location of the second vehicle received via a wireless communication network and/or image data received from a vehicle 100 camera sensor 130 with a field of view 150 including an exterior of the vehicle 100 and detecting the second vehicle in the received image of the camera sensor 130.

As discussed above, the computer 110 may estimate the 3D location of a light source based on the depth map and shadow of the light source on an object in the vehicle 100 interior 190, e.g., a shadow of an occupant 160 nose. For example, the computer 110 may be programmed based on the depth map and shadow of the light source, as discussed above, that the light source is an exterior light source, e.g., upon determining that a line connecting the shadow and the object, e.g., occupant 160 nose, passes through a side window of the vehicle 100 indicating the light being from an exterior light source.

Based on the estimated location and based on stored information in the computer 110 identifying the interior 190, e.g., 3D location of boundaries of the interior 190, the computer 110 can determine whether a light source that produces a polarized light is in the interior 190 of the vehicle 100. Upon determining that the source of polarized light is in the interior 190 (based on one or more polarization characteristics such as discussed above), the computer 110 determines the light source is either a user device 170 or a vehicle 100 HMI 140

The computer 110 may be programmed to determine whether the light source is a user device 170 based on a polarization map of the received image and a polarization characteristic of the user device 170. The computer 110 may be programmed to classify a light source as a user device 170 in the interior 190 based on the polarization map, depth map, and a location of the light source. For example, as discussed above, the computer 110 may detect polarized light, e.g., on a face of an occupant 160 based on the polarization map.

The computer 110 may be programmed to determine that the vehicle occupant is looking at the light source based on a detected vehicle 100 occupant 160 head direction or pose A1, a detected vehicle 100 occupant 160 eye gaze A2, and an estimated location of the light source. In the present context, a head direction or pose A1 is defined by a line substantially perpendicular to an occupant 160 forehead. "Eye gaze" herein means a direction, which can be described according to a line defined by a direction of an axis of an eye's lens, i.e., a direction in which a person's eyes are looking The computer 110 may be programmed to determine an occupant 160 head pose A1 and eye gaze A2 using conventional computer vision techniques based on the received image data including the occupant 160 face. The computer 110 may be programmed to determine an occupant 160 is looking at a detected user device 170 upon determining, using conventional geometrical techniques, that a distance d of the user device 170 from the head pose A1 is less than a threshold, e.g., 20 centimeter (cm). A distance d of a point to a line in a 3D space is a length of the shortest line from the point to the line, i.e., a line that passes through the point and is perpendicular to the line.

Additionally or alternatively, the computer 110 may be programmed to determine that occupant 160 is looking at the user device 170 based on the occupant 160 eye gaze A2, e.g., upon determining that a distance d from the user device 170 to a line specifying the eye gaze A2 is less than a threshold. Thus, the computer 110 may be programmed to determine, based on an eye gaze A2 of either of a right or left eye of the operator occupant 160, whether the occupant 160 eyes are looking at the user device 170.

The computer 110 may be programmed to determine that the operator occupant 160 is distracted when (i) the operator 160 looks at the user device 170 for a time exceeding a time threshold, e.g., 2 seconds (s), (ii) the operator 160 looks at the user device 170 with a frequency exceeding a frequency threshold, e.g., once a minute, and/or (iii) the operator occupant 160 looks at a media type such as interactive messaging or video playback. In the present context, a frequency of looking at a user device 170 is a number (or count) of times an operator occupant 160 looks (as defined above) at the user device 160160 per unit of time, e.g., 2 times per minute. A change of occupant 160 from a first position not looking at the user device 170 to a second position looking at the user device 170 is defined as one count. A first and second position are defined by the head pose A1 and/or the eye gaze A2. Additionally, the thresholds such as time threshold, frequency threshold, etc., may be determined based on a mode of operation of the vehicle 100 and/or a set of driver assistant features which are currently activated in the vehicle 100. For example, a first time threshold may be 4 seconds when only the vehicle 100 propulsion is controlled by the computer 110, whereas a second time threshold may be 2 seconds when propulsion, steering, and braking is controlled by the computer 110.

A user device 170 may output various types of media content. For example, a user device 170 may output a video playback, an interactive messaging, and/or a navigation instruction. The computer 110 may be programmed to determine based on changes of polarization map a type of media content of the user device 170. In one example, the computer 110 may store media type profile data in a computer 110 memory and determine the type of media based on the changes of the polarization map and the stored type profiles. A media type profile is a pattern including a rate of change of light luminosity, a rate of change of degree of polarization, etc., for each type of media. A media type profile may include a pattern of color change, pattern of illumination change, and/or spatial properties of color and illumination based on the camera sensor 130 location in the vehicle 100, the field of view 150, and/or screen size of user devices 170. A media type profile may be based on the camera sensor 130 location, because, for example, the sensor 130 may receive different amount of light from exterior light sources depending on a location, direction, and field of view 150, e.g., a sensor on the dashboard may receive more exterior light, whereas a sensor 130 mounted to a vehicle 100 A-pillar may receive less exterior light. In one example, a plurality of media type profiles each include information specifying at least one of a display of entertainment, e.g. the television program, web surfing associated with loading and scrolling of content, messaging, etc. Thus, in one example, the computer 110 may determine which media type is produced by the user device 170 based on determined rate of change of degree of polarization, determined rate of change of light luminosity, etc., and comparing the determined rates to the stored media type profiles.

The computer 110 may be programmed to actuate the vehicle 100 actuator 120 upon determining that the operator occupant 160 is distracted. In one example, the computer 110 may output a message to the vehicle 100 HMI 140, e.g., including an instruction to the occupant 160 to attend to the roadway. Additionally or alternatively, the computer 110 may activate a vehicle 100 autonomous mode of operation. Additionally or alternatively, the computer 110 may actuate a vehicle 100 actuator 120 to output a sound. Additionally or alternatively, the computer 110 may actuate a vehicle 100 actuator 120 to cause a haptic feedback in a vehicle 100 seat and/or vehicle 100 steering wheel.

Processing

Figure 3A:
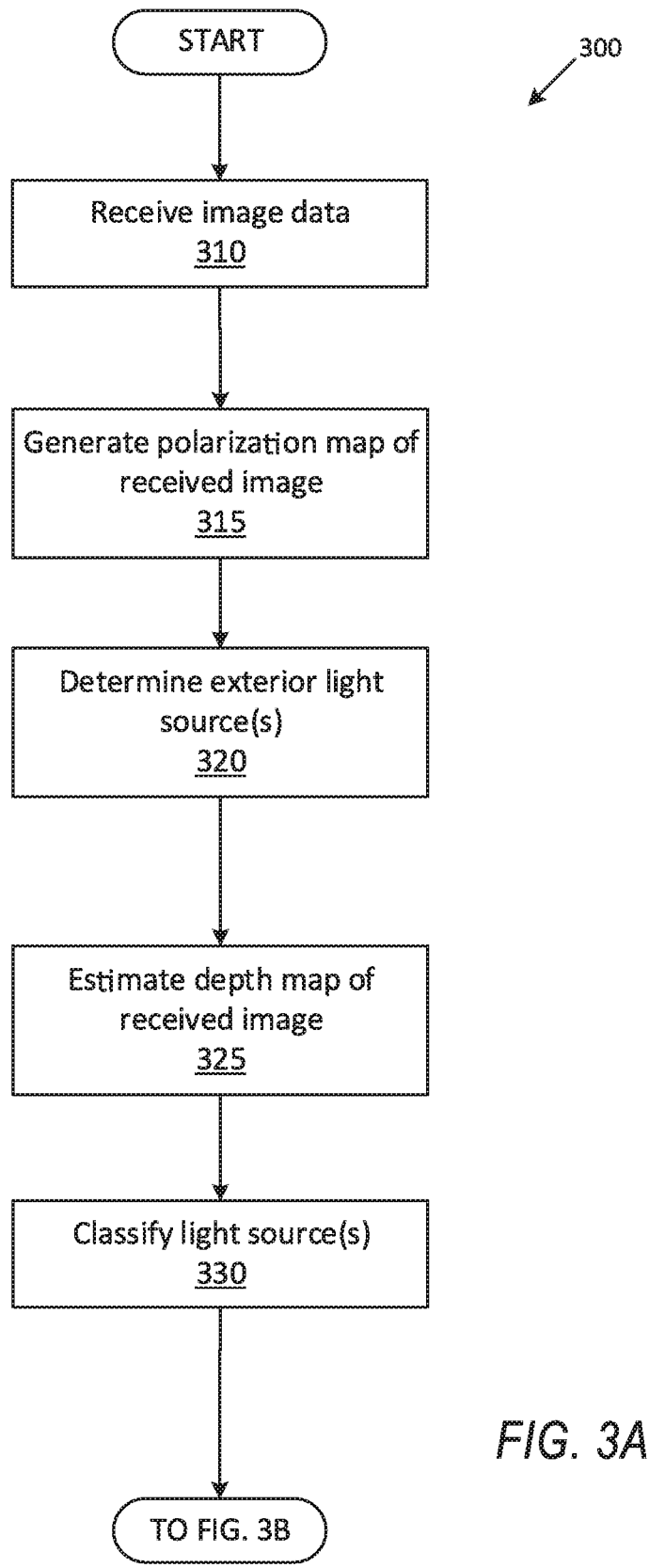
FIGS. 3A-3B are a flowchart of an exemplary process for operating the vehicle.
Figure 3B:
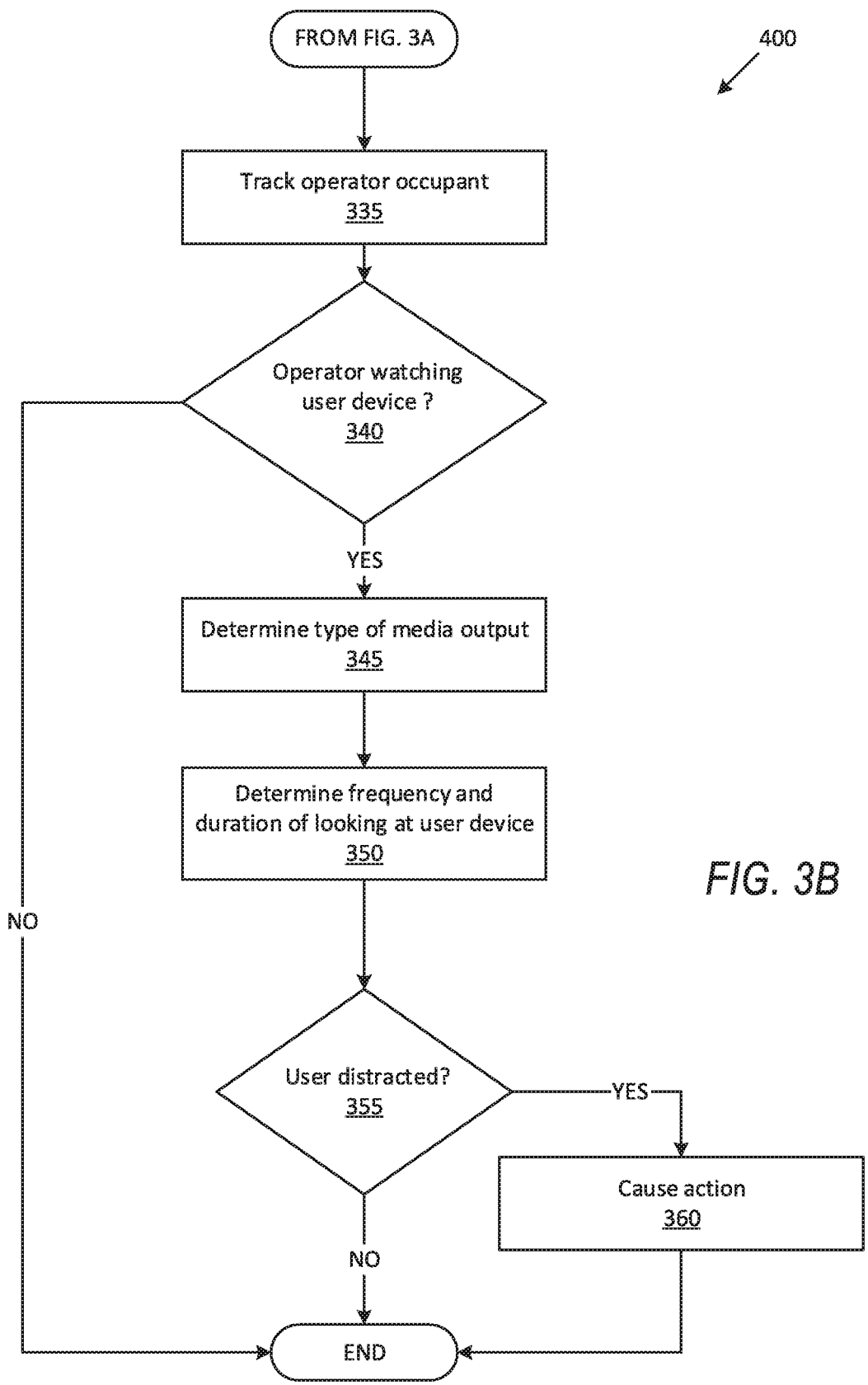

FIGS. 3A-3B show a flowchart of an exemplary process 300 for operating the vehicle 100. For example, the vehicle 100 computer 110 may be programmed to execute blocks of the process 300.

With reference to FIG. 3A, the process 300 begins in a block 310, in which the computer 110 receives image data from a polarimetric camera sensor 130, which has a field of view 150 including an interior 190 of the vehicle 100.

Next, in a block 315, the computer 110 generates a polarization map of the received image. The computer 110 may generate the polarization map based on the polarization degree, polarization direction, luminosity, and/or color of the received image data.

Next, in a block 320, the computer 110 identifies any exterior light source, e.g., second vehicle lights, the moon, the sun, street light, exterior illuminated display device such as road-side advertisement display. The computer 110 may be programmed to identify exterior light sources based on (i) vehicle 100 sensor(s) 130 data, e.g., a front camera sensor 130 detecting a second vehicle, a street light, a road-side display, etc., (ii) map data, e.g., including location of road side displays, street lights, etc., (iii) weather data, and/or (iv) sky dome model data, e.g., including a sun location, a moon location, etc.

Next, in a block 325, the computer 110 generates a depth map of the received image. The computer 110 may use conventional computer vision techniques to generate a depth map for the area of the interior 190 included in the field of view 150.

Next, in a block 330, the computer 110 classifies any detected light source(s). The computer 110 may be programmed to classify the light source(s) including light sources outside the field of view 150 based on the polarization map, depth map, data received from other vehicles, map data, etc. Following the block 330, the process 300 proceeds to a block 335 as shown in FIG. 3B.

Turning to FIG. 3B, in the block 335, the computer 110 identifies and tracks the operator occupant 160. The computer 110 may be programmed to detect the operator occupant 160, e.g., based on the received image data, stored data in the computer 110 memory specifying the location of an operator occupant 160, etc. The computer 110 may be programmed to track the operator occupant 160 by determining the occupant 160 head pose A1 and eye gaze A2 of the operator occupant 160.

Next, in a decision block 340, the computer 110 determines whether the operator occupant 160 looks at a user device 170. The computer 110 may be programmed to determine whether there is a user device 160 in the interior 190 based on the classified light sources and the 3D location of the light sources. Additionally, upon detecting a user device 160 in the interior 190 of the vehicle 100, the computer 110 may be programmed to determine based on the estimated 3D location of the user device 170, the operator occupant 160 head pose A1, and/or the operator occupant 160 eye gaze A2, whether the operator occupant 160 looks at the user device 170. If the computer 110 determines that the operator occupant 160 looks at the user devices 170, then the process 300 proceeds to a block 345; otherwise (i.e., if no user device 170 detected in the interior 190 or the operator occupant 160 does not look at a detected user device 170) the process 300 ends, or alternatively returns to the block 310, although not shown in FIGS. 3A-3B.

In the block 345, the computer 110 determines a type of media output of the user device 170. For example, the computer 110 may be programmed to determine that the user device 170 plays a video, outputs interactive messages, displays navigation instructions, etc., based on the polarization map and the stored media type profile data.

Next, in a block 350, the computer 110 determines a frequency of looking at the user device 170, and/or a duration of looking at the user device 170. The computer 110 may be programmed to store a plurality of image data and determine the frequency and duration of operator occupant 160 looking at the user device 170 based on the received image data.

Next, in a decision block 355, the computer 110 determines whether the operator occupant 110 is distracted. For example, the computer 110 may be programmed to determine that the operator occupant 160 is distracted when (i) the operator 160 looks at the user device 170 for a time duration exceeding a time threshold, (ii) the operator 160 looks at the user device 170 with a frequency exceeding a frequency threshold, and/or (iii) the operator 160 looks at a media type being one of a specified media types such as messaging or video playback. If the computer 110 determines that the operator 160 is distracted, then the process 300 proceeds to a block 360; otherwise the process 300 ends, or alternatively returns to the block 310.

In the block 360, the computer 110 causes an action. In one example, the computer 110 may output a message to the vehicle 100 HMI 140, e.g., including an instruction to the occupant 160 to attend to the roadway. Additionally or alternatively, the computer 110 may activate a vehicle 100 autonomous mode of operation. Additionally or alternatively, the computer 110 may actuate a vehicle 100 actuator 120 to output a sound. Additionally or alternatively, the computer 110 may actuate a vehicle 100 actuator 120 to cause a haptic feedback in a vehicle 100 seat and/or vehicle 100 steering wheel. Following the block 360, the process 300 ends, or alternatively returns to the block 310, although not shown in the FIGS. 3A-3B.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, Python, Intercal, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   determine location of a light source outside a field of view of a polarimetric image of a vehicle interior; and
   upon (a) determining, based on the polarimetric image, that the light source is other than vehicle lighting or an exterior source and (b) detecting a vehicle occupant, then
   actuate a vehicle actuator based on a determined location of the light source.

2. The system of claim 1, wherein the instructions further include instructions to actuate the vehicle actuator based on, in addition to the determined location of the first light source, (i) a frequency of the vehicle occupant looking at the light source exceeding a frequency threshold, (ii) whether the light source is a user device, (iii) a duration of the vehicle occupant looking at the light source exceeding a time threshold, and (iv) the vehicle occupant controlling at least one of vehicle propulsion, steering, and braking.

3. The system of claim 2, wherein the instructions further include instructions to actuate the vehicle actuator based on determining a type of media output of the user device based on a plurality of received polarimetric images, wherein the type of media is one of a video playback, an interactive messaging, and a displayed navigation instruction.

4. The system of claim 2, wherein the instructions further include instructions to determine that the vehicle occupant is looking at the light source based on a detected vehicle occupant head direction, a detected vehicle occupant eye gaze, and an estimated location of the light source.

5. The system of claim 1, further comprising a camera sensor having a polarizing imaging device, wherein the polarizing imaging device generates the polarimetric image data for each image pixel based on image attributes including a polarization axe, a luminosity, and a color space.

6. The system of claim 5, the instructions further include instructions to generate a de-mosaicked image based on the received image, and to generate a polarization map based on the de-mosaicked image.

7. The system of claim 1, wherein the exterior source is one of a sky dome, a sun, a moon, a street light, a light of a second vehicle, an illuminated display device, and a display mounted to a second vehicle.

8. The system of claim 1, wherein the instructions further include instructions to:
   classify the light source based on a polarization map and a depth map, wherein the depth map is generated based on the received polarimetric image; and determine a three-dimensional location of the light source based on the depth map and a detected shadow pattern of the light source on an object including a vehicle occupant within the received image.

9. The system of claim 1, wherein the instructions further include instructions to determine whether the light source is a user device based on a polarization map of the received image and a polarization characteristic of the user device.

10. The system of claim 1, wherein the instructions further include instructions to determine that a polarized light included in the received image is from a user device other than the vehicle lighting based on an actuation instruction sent to the vehicle display including a timing of actuating the vehicle lighting.

11. The system of claim 1, wherein the instructions further include instructions to determine a location of the environmental source based on a sky dome model and data received from a second computer including location coordinates of a second vehicle.

12. A method, comprising:
   determining location of a light source outside a field of view of a polarimetric image of a vehicle interior; and
   upon (a) determining, based on the polarimetric image, that the light source is other than vehicle lighting or an exterior source and (b) detecting a vehicle occupant, then
   actuating a vehicle actuator based on a determined location of the light source.

13. The method of claim 12, further comprising actuating the vehicle actuator based on, in addition to the determined location of the first light source, (i) a frequency of the vehicle occupant looking at the light source exceeding a frequency threshold, (ii) whether the light source is a user device, (iii) a duration of the vehicle occupant looking at the light source exceeding a time threshold, and (iv) the vehicle occupant controlling at least one of vehicle propulsion, steering, and braking.

14. The method of claim 12, further comprising actuating the vehicle actuator based on determining a type of media output of the user device based on a plurality of received polarimetric images, wherein the type of media is one of a video playback, an interactive messaging, and a displayed navigation instruction.

15. The method of claim 12, further comprising determining that the vehicle occupant is looking at the light source based on a detected vehicle occupant head direction, a detected vehicle occupant eye gaze, and an estimated location of the light source.

16. The method of claim 12, wherein the exterior source is one of a sky dome, a sun, a moon, a street light, a light of a second vehicle, an illuminated display device, and a display mounted to a second vehicle.

17. The method of claim 12, further comprising determining whether the light source is a user device based on a polarization map of the received image and a polarization characteristic of the user device, and classifying the light source based on a polarization map and a depth map, wherein the depth map is generated based on the received polarimetric image; and determining a three-dimensional location of the light source based on the depth map and a detected shadow pattern of the light source on an object including a vehicle occupant within the received image.

18. The method of claim 12, further comprising determining that a polarized light included in the received image is from a user device other than the vehicle lighting based on an actuation instruction sent to the vehicle display including a timing of actuating the vehicle lighting.

19. The method of claim 12, further comprising determining a location of the environmental source based on a sky dome model and data received from a second computer including location coordinates of a second vehicle.

20. A system, comprising:
   means for determining location of a light source outside a field of view of a polarimetric image of a vehicle interior; and
   means for actuating a vehicle actuator based on a determined location of the light source, upon (a) determining, based on the polarimetric image, that the light source is other than vehicle lighting or an exterior source and (b) detecting a vehicle occupant.

* * * * *